(12) United States Patent
Beers et al.

(10) Patent No.: US 10,087,760 B2
(45) Date of Patent: Oct. 2, 2018

(54) TURBINE NOZZLE AND SHROUD FOR AIR CYCLE MACHINE

(71) Applicant: Hamilton Sundstrand Corporation, Windsor Locks, CT (US)

(72) Inventors: Craig M. Beers, Wethersfield, CT (US); Brent J. Merritt, Southwick, MA (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 670 days.

(21) Appl. No.: 13/869,051

(22) Filed: Apr. 24, 2013

(65) Prior Publication Data

US 2014/0321964 A1 Oct. 30, 2014

(51) Int. Cl.
| | | |
|---|---|---|
| F01D 9/04 | (2006.01) |
| F01D 5/00 | (2006.01) |
| F01D 5/14 | (2006.01) |
| F01D 5/28 | (2006.01) |
| F02C 1/02 | (2006.01) |

(52) U.S. Cl.
CPC ............ *F01D 5/005* (2013.01); *F01D 5/147* (2013.01); *F01D 5/288* (2013.01); *F01D 9/041* (2013.01); *F01D 9/045* (2013.01); *F01D 9/048* (2013.01); *F01D 5/141* (2013.01); *F02C 1/02* (2013.01); *F05D 2230/80* (2013.01); *F05D 2230/90* (2013.01); *F05D 2240/128* (2013.01); *F05D 2260/95* (2013.01)

(58) Field of Classification Search
CPC .......... F01D 9/041; F01D 9/045; F01D 9/048; F01D 5/005; F01D 5/141; F01D 5/147; F01D 5/228; F01D 17/141; F05D 2230/80; F05D 2230/90; F05D 2240/128; F05D 2260/95; F02C 1/02
See application file for complete search history.

(56) References Cited

U.S. PATENT DOCUMENTS

| | | | |
|---|---|---|---|
| 3,972,644 A | | 8/1976 | Johnson |
| 4,726,101 A | | 2/1988 | Draghi et al. |
| 4,798,515 A | | 1/1989 | Hsia et al. |
| 5,142,778 A | * | 9/1992 | Smolinski ............... B23K 26/00 219/121.66 |
| 5,224,842 A | * | 7/1993 | Dziorny ................ F04D 29/102 417/406 |
| 5,249,934 A | * | 10/1993 | Merritt ................ F04D 29/5853 417/406 |
| 5,299,909 A | | 4/1994 | Wulf |
| 5,311,749 A | * | 5/1994 | McAuliffe ................ F02C 3/32 415/12 |
| 5,460,003 A | * | 10/1995 | Nenov .................... F01D 9/045 415/186 |

(Continued)

*Primary Examiner* — Ninh H Nguyen
(74) *Attorney, Agent, or Firm* — Carlson, Gaskey & Olds, P.C.

(57) ABSTRACT

A nozzle and shroud for use in an air cycle machine has a plate and a shroud curving in a first axial direction about a center axis of the shroud relative to the plate. A plurality of vanes extends in a second axial direction away from the plate. The plurality of vanes extends for a height away from the plate and a width defined as the closest distance between two adjacent vanes, with a ratio of the height to the width being between 0.1091 and 0.1401. An air cycle machine and a method of repair are also disclosed.

7 Claims, 3 Drawing Sheets

(56) References Cited

U.S. PATENT DOCUMENTS

| | | | |
|---|---|---|---|
| 5,522,134 A * | 6/1996 | Rowe | B23P 6/005 |
| | | | 29/402.08 |
| 5,630,700 A | 5/1997 | Olsen et al. | |
| 6,109,867 A | 8/2000 | Portefaix | |
| 6,789,315 B2 * | 9/2004 | Marques | B23P 6/002 |
| | | | 228/119 |
| 6,810,666 B2 * | 11/2004 | Lutz | F01D 17/167 |
| | | | 415/158 |
| 6,942,183 B2 | 9/2005 | Zywiak | |
| 7,322,202 B2 | 1/2008 | Zywiak et al. | |
| 7,779,644 B2 | 8/2010 | Decrissantis et al. | |
| 8,113,787 B2 * | 2/2012 | Barril | F01D 5/288 |
| | | | 416/224 |
| 8,347,647 B2 | 1/2013 | McAuliffe et al. | |
| 2012/0156028 A1 * | 6/2012 | Colson | F01D 25/28 |
| | | | 415/208.2 |

\* cited by examiner

TURBINE NOZZLE AND SHROUD FOR AIR CYCLE MACHINE

BACKGROUND

This application relates to a turbine nozzle for use in an air cycle machine.

Air cycle machines are known and, typically, include one or more turbines which receive a compressed air source, and are driven to rotate. The turbines, in turn, rotate a compressor rotor. Air is conditioned by the air cycle machine and moved for use in an aircraft cabin air conditioning and temperature control system.

The turbines are typically provided with a nozzle and shroud which controls the flow of air upstream and downstream of a turbine rotor.

SUMMARY

A nozzle and shroud for use in an air cycle machine has a plate and a shroud curving in a first axial direction about a center axis of the shroud relative to the plate. A plurality of vanes extends in a second axial direction away from the plate. The plurality of vanes extends for a height away from the plate and a width defined as the closest distance between two adjacent vanes, with a ratio of the height to the width being between 0.1091 and 0.1401. An air cycle machine and a method of repair are also disclosed.

These and other features may be best understood from the following drawings and specification.

DETAILED DESCRIPTION

Figure 1A:
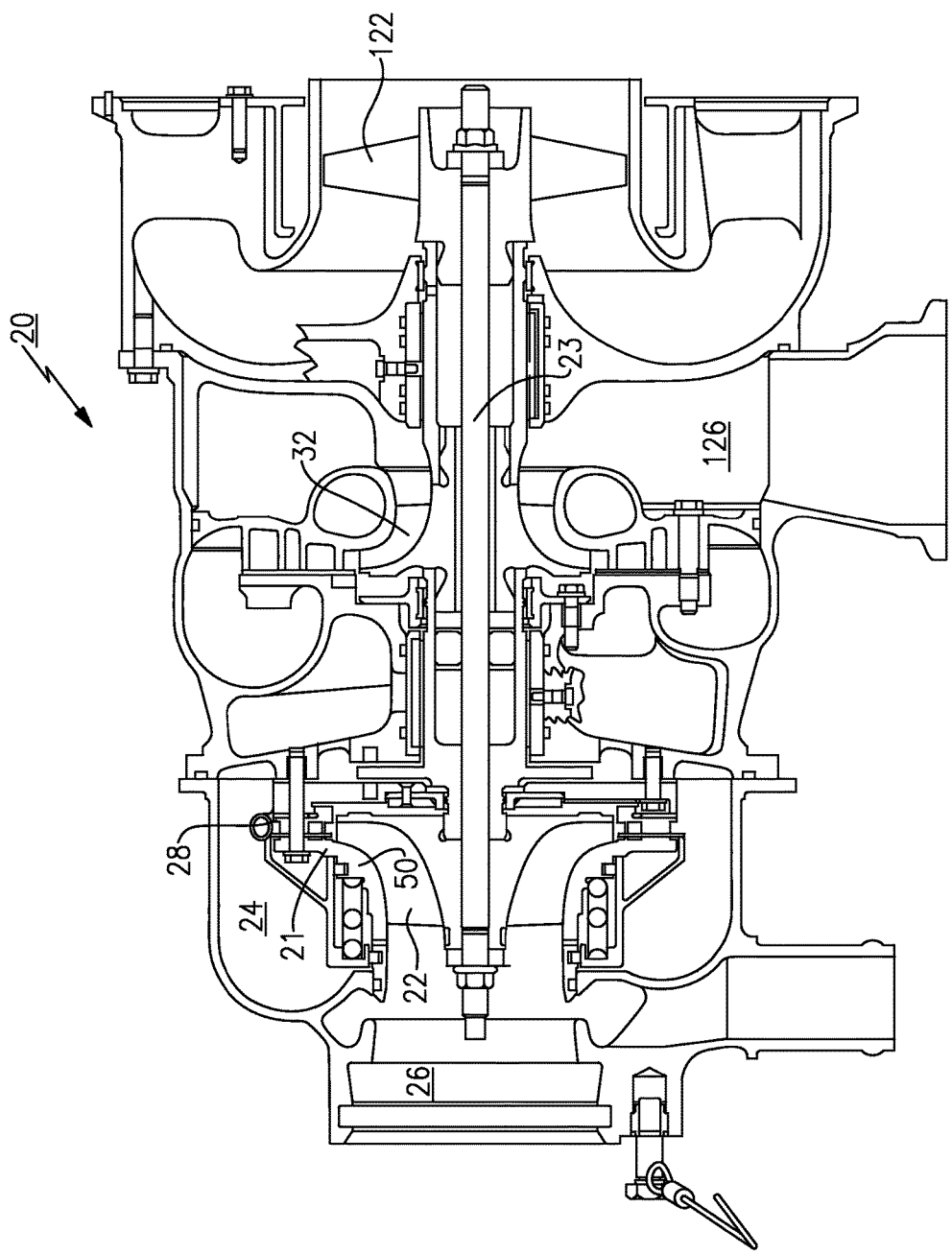
FIG. 1A shows an air cycle machine.

An air cycle machine 20 incorporates a turbine rotor 22 as shown in FIG. 1. A compressor rotor 32 receives a source of compressed air 126 and further compresses the air. The compressed air is delivered into an inlet and passes over turbine rotor 22 and to an outlet 26. Outlet 26 communicates into an aircraft cabin. The turbine rotor 22 drives a shaft 23 to, in turn, rotate a fan rotor 122 and a compressor rotor 32.

A primary nozzle 28 and secondary nozzle 21 condition the air from the inlet 24 as it approaches the turbine rotor 22.

Figure 1B:
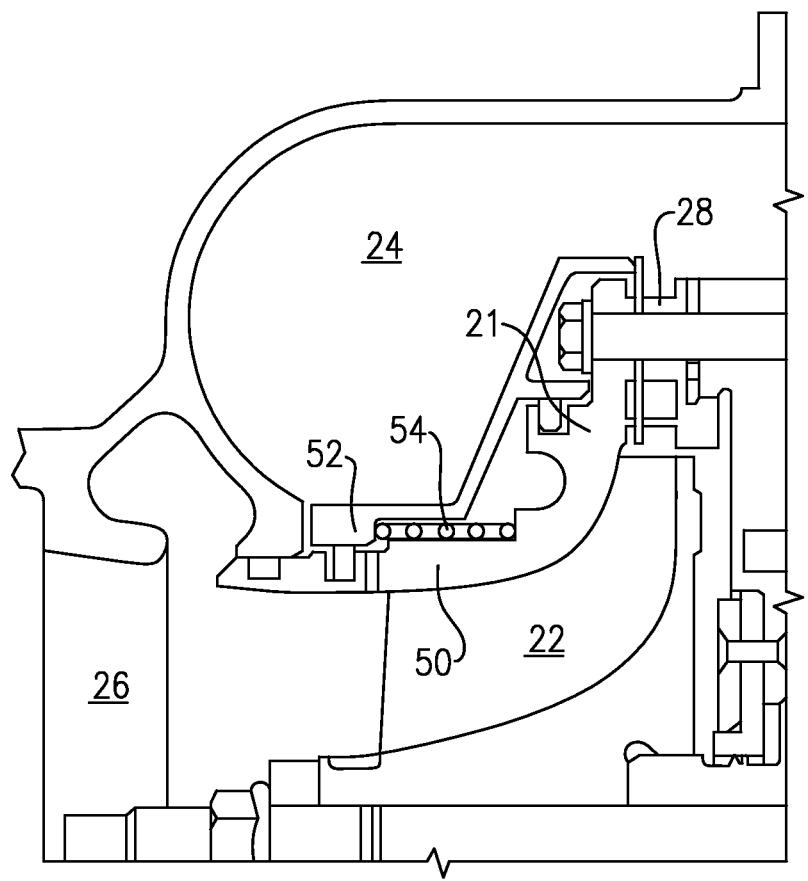
FIG. 1B shows a detail of a turbine rotor and nozzle.

As shown in FIG. 1B, the turbine rotor 22 is positioned radially inwardly of a primary nozzle 28. A shroud 50 is incorporated with secondary nozzle 21, and is positioned to surround the rotor 22 and pass in a downstream direction from the primary nozzle 28. A nozzle slider 52 is biased by a spring 54 away from the nozzles 21 and 28.

During ground operation, a pressure in the turbine inlet chamber 24 is sufficiently high to overcome a force from spring 54. The slider 52, thus, sits in the closed position as illustrated.

At higher altitude, the relationship described above is no longer true and the slider 52 can move to the left as shown in this Figure and increase a nozzle flow area. More air is needed for cooling the aircraft cabin on the ground, and this nozzle combination provides more while an associated aircraft is on the ground.

Figure 2A:
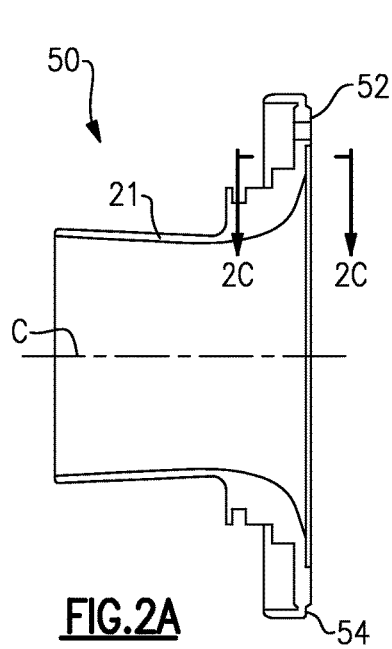
FIG. 2A shows a shroud and nozzle assembly.

As shown in FIG. 2A, the secondary nozzle 21 includes a shroud 50 which curves forwardly along a center axis C. A plate 54 has a plurality of vanes 52 extending in a direction opposed to the direction of the shroud 50. As is clear, the shroud extends to a location downstream of rotor 22, and vanes 52 are upstream of the rotor 22.

Figure 2B:
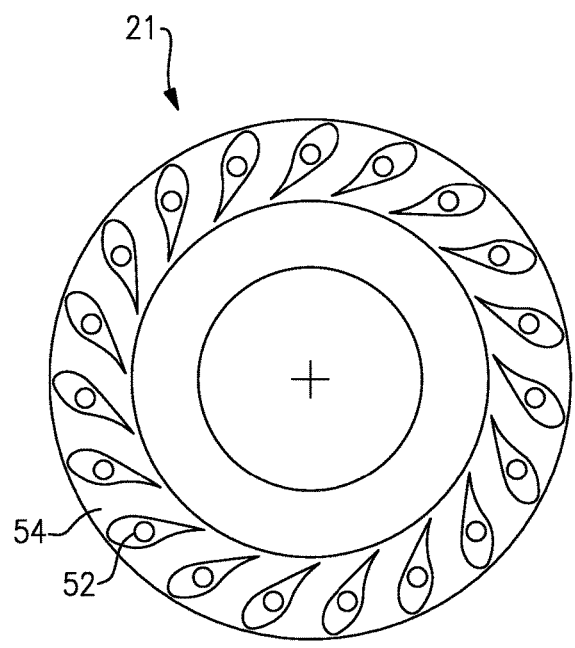
FIG. 2B is a rear view of the FIG. 2A nozzle assembly.

As shown in FIG. 2B, there are a plurality of vanes 52. In one embodiment, there were 19 of the vanes.

Figure 2C:
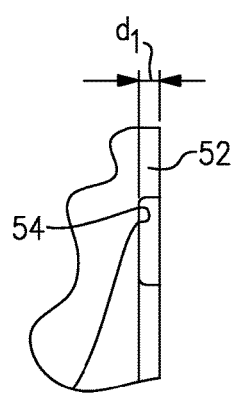
FIG. 2C is a cross-sectional view along line 2C-2C of FIG. 2A.
Figure 2D:
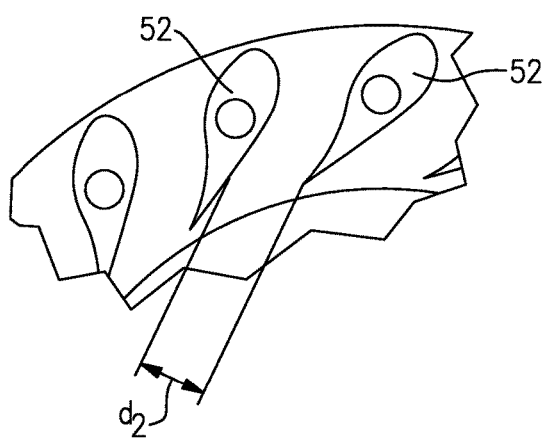
FIG. 2D shows a detail.

As shown in FIG. 2C, the vanes 52 extend for a distance $d_1$ from the plate 54. As shown in FIG. 2D, the adjacent vanes 52 are spaced by a closest distance or width $d_2$. In embodiments, $d_1$ was 0.040 inch (1.02 centimeters), and $d_2$ was 0.322 inch (0.818 centimeters). A total flow area, defined between all 19 of the vanes and at the height and width mentioned above, was 0.245 square inches (1.581 square centimeters).

The nozzle 21 and shroud 50 has a tungsten carbide erosion coating. The shroud and nozzle 127 is formed of a base of aluminium and then provided with a tungsten carbide erosion coating. Preferably, a high velocity oxy fuel coating technique is provided utilizing continuous burning.

In embodiments, a ratio of $d_1$ to $d_2$ is between 0.1091 and 0.1401. The total flow area ranges between 0.2148 and 0.2759.

A method of repairing the air cycle machine 20 includes the steps of removing a nozzle and shroud combination 21/50 from a location adjacent turbine rotor 22. The removed nozzle and shroud combination is replaced with a replacement nozzle and shroud combination 21/50.

Details of the primary nozzle 28 are disclosed and claimed in co-pending application Ser. No. 13/869,053, entitled Turbine Nozzle for Air Cycle Machines, and filed on even date herewith.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A nozzle and shroud for use in an air cycle machine comprising:
   a plate and a shroud curving in a first axial direction about a center axis of said shroud relative to said plate;
   a plurality of vanes extending in a second axial direction away from said plate, with said plurality of vanes extending for a height away from said plate and a width being defined as the closest distance between two adjacent vanes, with a ratio of said height to said width being between 0.1091 and 0.1401;
   wherein there are 19 circumferentially spaced ones of said vanes; and
   wherein a total flow area is defined between all 19 of said vanes and said total flow area being between 0.2148 and 0.2759 square inches (1.3856-1.7799 square centimeters).

2. The nozzle and shroud as set forth in claim 1, wherein said plate and said shroud are formed of a base aluminum material provided with a tungsten carbide erosion coating.

3. An air cycle machine comprising:
   a turbine rotor configured to drive a shaft, and a compressor rotor driven by said shaft, and a fan rotor driven by said shaft;

a shroud and nozzle combination provided adjacent said turbine rotor with said nozzle being at a location upstream of said turbine rotor, and said shroud curving to a location downstream of said turbine rotor and said shroud and nozzle including a plate and said shroud curving in a first axial direction about a center axis of said shroud relative to said plate;

a plurality of vanes extending in a second axial direction away from said plate, with said plurality of vanes extending for a height away from said plate and a width being defined as the closest distance between two adjacent vanes, with a ratio of said height to said width being between 0.1091 and 0.1401;

wherein there are 19 circumferentially spaced ones of said vanes; and wherein a total flow area is defined between all 19 of said vanes and said total flow area being between 0.2148 and 0.2759 square inches (1.3856-1.7799 square centimeters).

4. The air cycle machine as set forth in claim 3, wherein said nozzle is associated with a slider that moves relative to said nozzle dependent on flow condition to change a flow area, with said slider being movable between a closed position and a more open position, and said total flow area being defined at said closed position.

5. The air cycle machine as set forth in claim 4, wherein said slider is biased to the more open position.

6. The air cycle machine as set forth in claim 3, wherein said plate and said shroud is formed of a base aluminum material provided with a tungsten carbide erosion coating.

7. A method of repairing an air cycle machine comprising the steps of:
(a) removing a nozzle and shroud combination from a location adjacent a turbine rotor in an air cycle machine, and replacing said removed shroud and nozzle combination with a replacement shroud and nozzle combination;
(b) the replacement nozzle and shroud combination including a plate and a shroud curving in a first axial direction about a center axis of said shroud relative to said plate, and a plurality of vanes extending in a second axial direction away from said plate, with said plurality of vanes extending for a height away from said plate and a width being defined as the closest distance between two adjacent vanes, with a ratio of said height to said width being between 0.1091 and 0.1401;

wherein there are 19 circumferentially spaced ones of said vanes; and wherein a total flow area is defined between all 19 of said vanes and said total flow area being between 0.2148 and 0.2759 square inches (1.3856-1.7799 square centimeters).

* * * * *